(12) United States Patent
Ishii

(10) Patent No.: US 7,495,828 B2
(45) Date of Patent: Feb. 24, 2009

(54) HIGH CONTRAST PROJECTION SCREEN

(76) Inventor: Fusao Ishii, 350 Sharon Park Dr., G26, Menlo Park, CA (US) 94025

( * ) Notice: Subject to any disclaimer, the term of this patent is extended or adjusted under 35 U.S.C. 154(b) by 452 days.

(21) Appl. No.: 11/285,881

(22) Filed: Nov. 23, 2005

(65) Prior Publication Data

US 2007/0115549 A1 May 24, 2007

(51) Int. Cl.
*G03B 21/56* (2006.01)
*G03B 21/60* (2006.01)

(52) U.S. Cl. ..................... 359/449; 359/459

(58) Field of Classification Search .............. 359/443, 359/742–743, 449, 459, 457
See application file for complete search history.

(56) References Cited

U.S. PATENT DOCUMENTS

| | | | |
|---|---|---|---|
| 4,911,529 A * | 3/1990 | Van De Ven | 359/454 |
| 5,801,889 A | 9/1998 | Meyers et al. | |
| 5,969,867 A * | 10/1999 | Fukushima et al. | 359/581 |
| 6,678,097 B2 * | 1/2004 | McKenney | 359/742 |
| 6,842,282 B2 * | 1/2005 | Kuroda et al. | 359/449 |
| 6,898,008 B1 * | 5/2005 | Sun | 359/443 |

\* cited by examiner

*Primary Examiner*—Christopher E Mahoney
(74) *Attorney, Agent, or Firm*—Bo-In Lin

(57) ABSTRACT

An image display system includes a reflecting screen that has a reflecting surface. The reflecting surface includes micro-ridges having a plurality of reflecting ridge-surfaces wherein the reflecting ridge-surfaces constituting a Fresnel mirror whereby the reflecting ridge-surfaces reflecting parallel reflecting light beams for all incident light beams projected from a light source located at a focal point of the Fresnel mirror. The micro-ridges further include a plurality of darkened ridge-surfaces with reduced reflectance for reducing ambient reflections. The micro-ridges further constitute a continuous concentric ridge having the reflecting ridge-surfaces facing a bottom direction toward the focal point of the Fresnel mirror for disposing a light source near a bottom location of the projecting screen. The continuous concentric ridge further has reduced reflectance ridge-surfaces facing a top direction away from the focal point of the Fresnel mirror.

34 Claims, 4 Drawing Sheets

US 7,495,828 B2

HIGH CONTRAST PROJECTION SCREEN

TECHNICAL FIELD

This invention relates to display system for projecting an image on a screen to display the image on the screen. More particularly, this invention relates to projection screen with improved contrast by directing the ambient reflection lights away from a viewer thus totally eliminating ambient interferences.

BACKGROUND ART

Image display on the front projection screens often encounters a difficulty that the viewers of such image often experience a poor contrast due to the interferences from the ambient lights reflected from the projection screen. The interferences from ambient reflection is especially pronounced in a well-lighted room. For this reason, it is often required to turn off the light in a room to provide a better view of the displayed image. One method to overcome the poor view of image is to project the image with higher luminance. However, the ambient reflections often cause uncomfortable glares in a viewer's eyes when the front projection screen is projected with the high power projectors. Conventional technologies for providing high contrast projection screens are still limited by the difficulties that the screens are either manufactured with multiple layers or requiring special processes or materials. Such multiple layered screen or specially processed surface are usually complicated to fabricate and very costly. Front end projection display with reflective type of display screens are therefore limited by these technical difficulties and also by the economic limitations since a it is very expensive to provide the high contrast projection screen with ambient light elimination or reduction.

Braun et al. disclose in U.S. Pat. No. 5,335,022 a front projection video display system that implements a combination of components to overcome the difficulties caused by the ambient reflections. The video display system includes components of a front-projection video projector which projects an image of particular direction of polarization; polarizing lenses which polarize light radiated from room light fixtures in a direction orthogonal to that of the projected image; a polarizing filter to substantially transmit light polarized parallel to the projected image and substantially blocks light orthogonal to the projected image; and a polarization maintaining (PM) projection screen to receive the projected image for viewing by the viewers. Such systems however are more costly and difficult to implement due to the several components required to combine into a low contrast video projection system. The polarized projection screen further reduces the light intensity and leads to an undesirable effect of reducing the brightness of the display images due to the fact that only the light beams of specific polarization are reflected. With the polarizer, this method reduces the ambient light by half, but it does not provide a complete solution because there are still significant interferences caused by the remaining unnecessary ambient light.

Lambert et al. disclose in U.S. Pat. No. 6,597,501 a projection screen to provide an improved contrast between projected light and ambient light. The projection screen includes a light-absorbing layer and an active layer located in front of said light-absorbing layer. The active layer is transparent to light having a first direction of polarization and reflective to light having a second direction of polarization. The reflecting polarizing layer may be provided between the active layer and the light-absorbing layer. Again, this multiple layered screen with polarization reflection is more costly and complicate to implement. Furthermore, the polarization projection as discussed above leads to reduced brightness of display images thus degrades the image quality Again, like what are discussed above, by applying the polarizer, this method reduces the ambient light by half, but it does not provide a complete solution due to the significant interferences caused by the remaining unnecessary ambient light.

Kuoda et al. disclose in U.S. Pat. No. 6,842,282 a front projection screen that has a front shading sheet facing a viewing side formed with a transparent material. The front shading sheet has a front surface provided with a plurality of horizontal, parallel, minute ridges and these minute ridges have a triangular cross section and each having an upper side surface coated with a shading layer. The projection screen further includes a rear transparent filler layer formed with a material having a refractive index nearly equal to that of the transparent material of the front shading sheet. Furthermore, transparent glass beads are embedded uniformly in a plane in the rear surface of the transparent filler layer and the rear surface of the transparent filler layer is coated with a white, reflecting adhesive layer. An opaque film impermeable to light is applied to the rear surface of the reflecting adhesive layer. The front projection screen has a large viewing angle, does not reflect an environmental image even in a light environment, and is capable of displaying a high-definition image having a high black level and a high contrast. However, as can be clearly understood, such multiple layered projection screen embedded with beads are costly and inconvenient to implement. Furthermore, the horizontal ridges as disclosed can only reduce the ambient interferences for light beams incident from above the screen. The horizontal ridges have no effect to reduce the ambient interferences when the incident light beams are projected from a viewer's direction or from other sides of the screen. Therefore, the contrast of image display can only be partially improved due to the limited reductions of ambient reflections.

A Patent Application Publication 20050128583 discloses a high contrast projection screen by implementing a broadband projection-receiving surface. The surface of the project screen is formed by applying a specialized surface production technology that utilizes purposeful partitioning of the material processes used in sub-wavelength morphology (finish) from the processes used to make super-wavelength morphology. Such specialized production method however requires special processing equipment and materials thus greatly increase the cost and manufacturing complexities of the projection screen.

There are more recent development efforts to provide projection screens as that shown in FIG. 1. The projection screen has wedges that receive incident light 20 projected horizontally from a light source located in a viewer area. Then, another wedge surface reflects the incident light as parallel light back to a parallel direction to a viewer's direction. As shown in FIG. 1, there are other ambient lights, e.g., incident light 40, from the ceiling or from other light sources such as sun light that is incident onto the wedge surfaces. These ambient incident lights, e.g., incident light 40, is reflected back from the wedge surface as reflecting light 50 that will interfere with the display images projected from the light source (not shown). Therefore, the projection screen with a wedge surface when a light source is located near a viewer's area for projecting image light horizontally to the reflecting screen even with wedge to reduce the ambient reflection is not sufficient to resolve the problems of ambient light interferences.

There are many patents related to projection screen with ambient light reduction or elimination that includes U.S. Pat. Nos. 6,829,086, 6,624,936, 6,346,311, 4,911,529, and 4,566, 756, and U.S. patent applications including Publications 20030137728, 20010030804, and 20010028501. However, these inventions have not addressed and provided direct resolutions for a person of ordinary skill in the art to overcome the above-discussed limitations and difficulties.

Therefore, a need still exists in the art of image display systems to provide new and improved projection screens to reduce and eliminate ambient light reflections such that the above-discussed difficulties can be resolved.

SUMMARY OF THE INVENTION

It is an aspect of the present invention that the front-end projection screen for reflecting the incident image light beams has circular ridges formed on a flat surface with these the reflection portions of the ridges form a combined Fresnel surface to reflect all the incident beam from a focal point of the Fresnel surface to horizontal parallel light beams directing to the viewer. Reduction of image brightness due to reflection of only a portion of the lights as that disclosed in conventional polarized reflection screen can therefore be eliminated while the ambient light interferences can be reduced.

In another aspect, the present invention provides a front-end projection screen for reflection the incident image light beams that has micro-ridges formed with a reflection portion located on the bottom facing the image light source disposed at the bottom of the screen and a non-reflection top portion. The non-reflection top ridge surfaces are coated with a non-reflecting dark material such that the ambient light mostly incident from the lights typically disposed on the ceiling can be eliminated. This method can avoid the interference of the ambient light that may project to the screen from top, side and even from the direction of the viewers, e.g., from the front direction of the reflection screen.

In yet another aspect, the present invention provides a front projection display system with the image light source disposed at the bottom of the screen to project an image onto a reflecting screen. The reflecting screen has micro-ridges with a bottom reflecting portions facing the incident image light. The bottom portions of the micro-ridges are further combined to form a Fresnel surface to reflecting all the incident light beam as horizontal reflecting light to a viewer to provide clear and high quality image display with the image light source located at the focal point of the Fresnel surface with a short distance away from the projection screen.

In yet another aspect, the present invention provides a method of manufacturing a front-end projection screen by pressing a UV curable surface into circular ridges with the bottom portions of the micro-ridges forming a Fresnel surface. The projection screen can therefore be produced very economically without requiring complicate and sophisticate manufacturing processes.

Briefly in a preferred embodiment, this invention discloses a reflecting screen that has a reflecting surface. The reflecting surface includes micro-ridges having a plurality of reflecting ridge-surfaces wherein the reflecting ridge-surfaces constituting a Fresnel mirror whereby the reflecting ridge-surfaces reflecting parallel reflecting light beams for all incident light beams projected from a light source located at a focal point of the Fresnel mirror. The micro-ridges further include a plurality of darkened ridge-surfaces with reduced reflectance for reducing ambient reflections. The micro-ridges further constitute a continuous concentric ridge having the reflecting ridge-surfaces facing a bottom direction toward the focal point of the Fresnel mirror for disposing a light source near a bottom location of the projecting screen. The continuous concentric ridge further has reduced reflectance ridge-surfaces facing a top direction away from the focal point of the Fresnel mirror.

These and other objects and advantages of the present invention will no doubt become obvious to those of ordinary skill in the art after having read the following detailed description of the preferred embodiment, which is illustrated in the various drawing figures.

BRIEF DESCRIPTION OF FIGURES

The present invention is described in detail below with reference to the following Figures.

DESCRIPTION OF PREFERRED EMBODIMENTS

Figure 2:
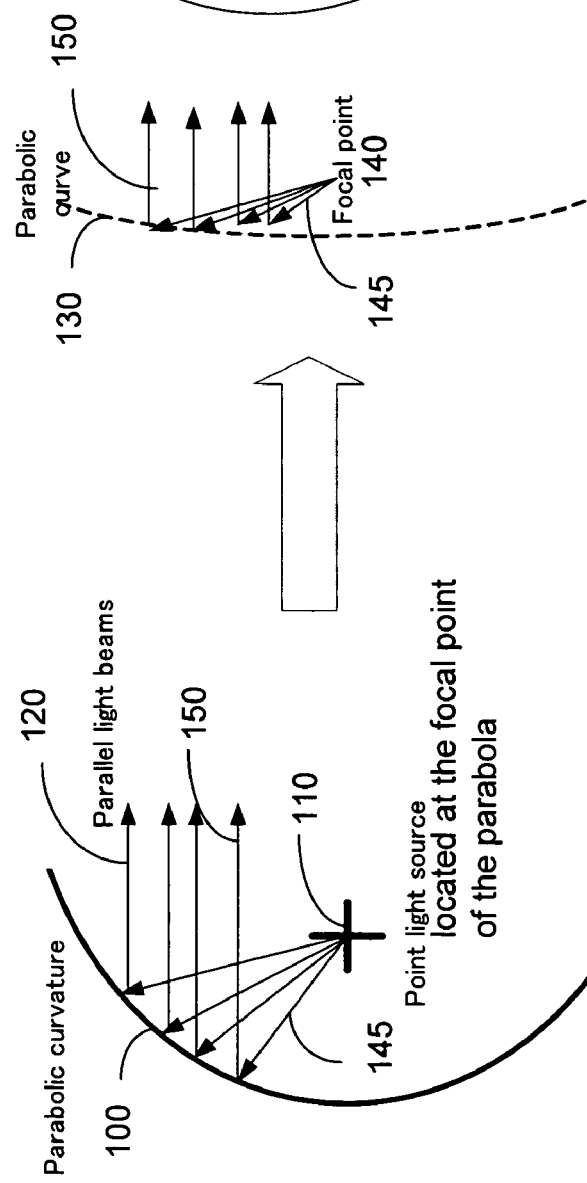
FIG. 2A is a cross sectional view of a parabolic surface reflecting the incident beams from the focal points to parallel reflected light beams.
FIG. 2B is a cross sectional view of Fresnel mirror with flat surface but has parabolic curvature for reflecting the incident beams from the focal points to parallel reflected light beams.
FIG. 2C is a top view of the Fresnel mirror formed with circular ridges with a portion of the ridge surfaces forming the Fresnel mirror as that shown in FIG. 2B.

FIG. 2A shows a mirror 100 with parabolic curvature that received light projected from a light source 110. The light source 110 is located at the foal point of the parabola and the reflected light 120 from the parabolic mirror are all directed in parallel along a horizontal direction to a viewer. Therefore, theoretically, a reflective projection screen with a parabolic surface such as the mirror 100 would be most suitable to function as a projection screen for a front-end projection display system. However, a viewer does not feel comfortable looking at a parabolic screen. Furthermore, a parabolic screen is more difficult and costly to manufacture. is difficult to manufacture.

Figure 1:
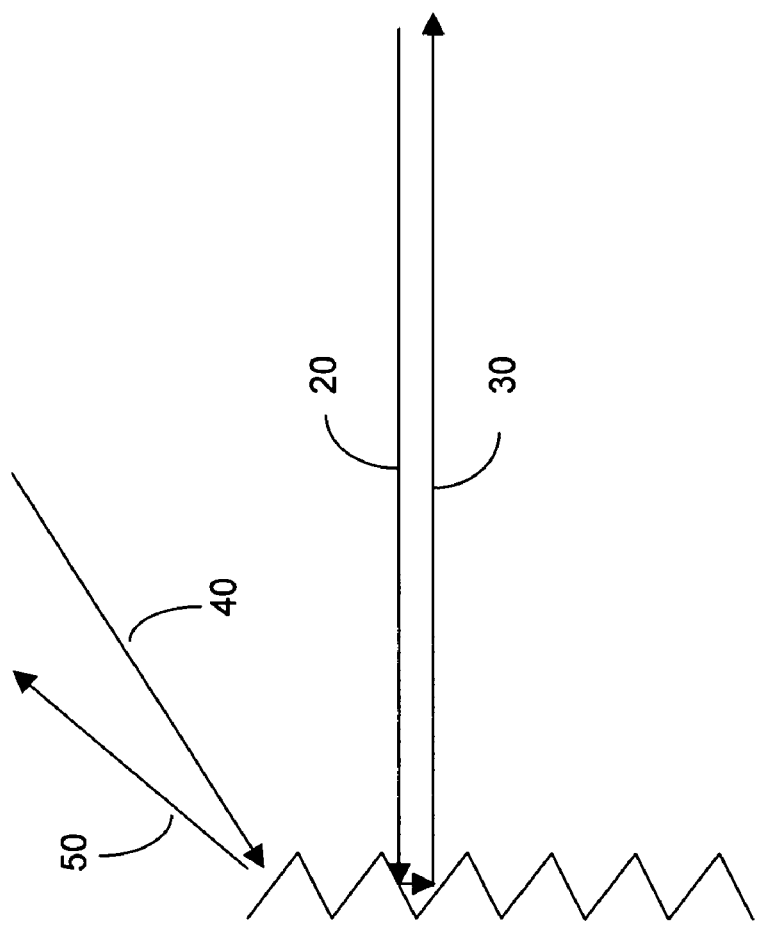
FIG. 1 is a cross sectional view of a conventional projection screen of micro-ridges for projecting the horizontally incident light back to a parallel horizontal direction but cannot reduce the ambient interferences when the incident light beams are incident from other directions.

FIGS. 2B and 2C are cross sectional view and front view of a Fresnel mirror 130 with parabolic curvature according to an embodiment of this invention. The Fresnel mirror 130 is supported on a substantially flat and thin surface. The Fresnel mirror 130 achieves the same results as shown in FIG. 1B where the light beams projected from the light source 140 disposed on a focal point of the Fresnel mirror also reflected as parallel light 150 along a horizontal direction to the viewer. The Fresnel mirror presents a much more comfortable form factor to a viewer and are much less expensive to manufacture compared to the parabolic mirror shown in FIG. 1A.

Figure 3:
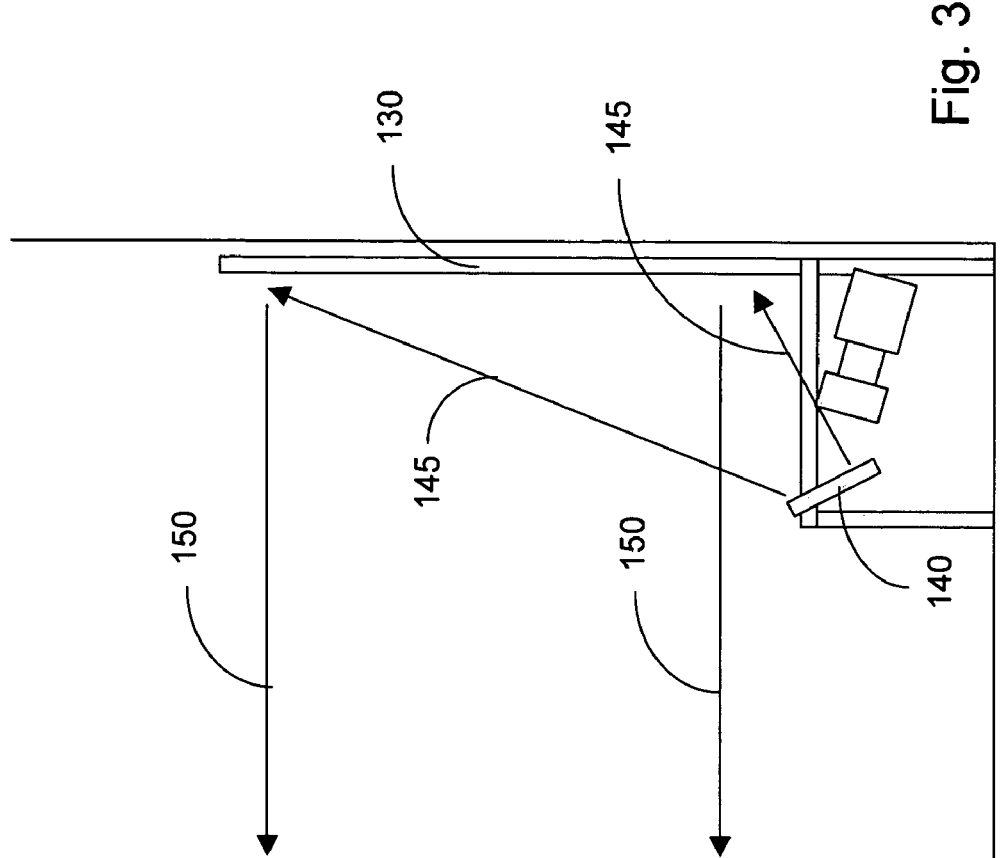
FIG. 3 is a side cross sectional view of a front projecting display system with light source disposed at a focal point of the Fresnel mirror shown in FIGS. 2B and 2C.

FIG. 3 shows a front end projection television of this invention where a front end reflection screen implemented with the Fresnel mirror 130 as that shown in FIGS. 2B and 2C. A TV light source 140 is placed on the focal point at the bottom of the Fresnel mirror 130 to project image light beam to the screen 130 and to reflect these light beam as parallel light beams 150 to a viewer sitting in front of the projection screen now configured as a Fresnel mirror 130.

Figure 4:
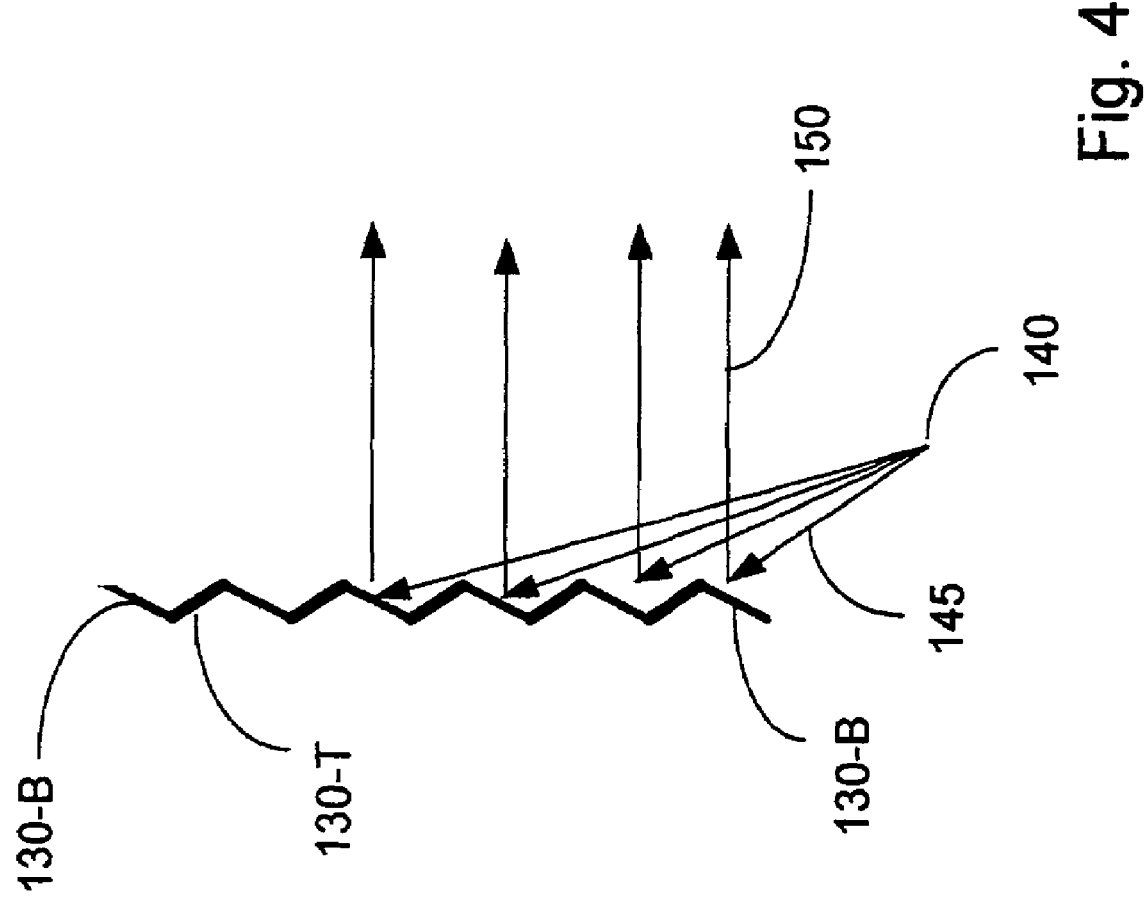
FIG. 4 is a cross sectional view of the micro-ridges formed on the projecting screen of FIG. 3 with the bottom surfaces formed as the Fresnel mirror and the top surfaces coated with dark material to reduce ambient reflections.

FIG. 4 is a cross sectional view of a reflecting projection screen of this invention. The reflecting projection screen is formed with wedges with each wedge includes two reflecting surfaces 130-B designating the bottom surfaces and 130-T designating the top reflecting surfaces. The bottom reflecting surfaces 130-B are reflecting surfaces and configured to combine as a Fresnel mirror 130 to reflect all the incident beams 145 projected from a light source 140 located at a focal point to a viewer as reflected beams 150 wherein the reflected beams 150 are projected as parallel horizontal beams to a viewer. The top surfaces 130-T are dyed to reduce the reflectance thus eliminating the ambient interferences.

Referring to FIG. 4 again for the reflecting projection screen 130 that illustrates an exemplary embodiment of this invention. The reflecting projection screen is manufactured by first applying a ultraviolet (UV) curable resin on a sheet or roll composed of acrylic plastic with photo-sensitizer followed by forming the Fresnel pattern with a press mold or a pattern roller followed by applying an UV exposure to solidify the material. Then a reflective coating is applied to coat the surface to form the reflecting surfaces on both the top and bottom surfaces 130-T and 130-B. A dark coating composed of carbon or of other non-reflective materials is applied to coat the bottom and top surfaces with a dark surface with a reduced reflectance. A photo-resist is applied and the bottom surfaces 130-B are exposed to expose to the light source located at the focal point of the parabola of the Fresnel mirrors. After the light exposure onto the bottom surfaces 130-B, an etch is carried out to remove the dark coating from the exposed surfaces 130-B so that the reflective surfaces now is exposed to reflect the incident beam as parallel horizontal beams to a viewer. Meanwhile, the top surfaces 130-T are darkened to reduce the ambient light reflections for improving the contrast of an image display with the image light source projecting incident light from the focal point located at the bottom of the projecting reflection screen 130.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A reflecting screen comprising:
a reflecting surface comprising micro-ridges having a plurality of reflecting ridge-surfaces each of said reflecting ridge-surfaces having a curved surface and each of said curved surfaces having a different center of curvature to form a substantially flat combined surface wherein said reflecting ridge-surfaces further constituting a Fresnel mirror whereby said reflecting ridge-surfaces reflecting substantially parallel reflecting light beams for all incident light beams projected from a light source located at a focal point of said Fresnel mirror.

2. The reflecting screen of claim 1 wherein:
said micro-ridges further having a plurality of darkened ridge-surfaces between said reflecting-ridge surfaces wherein said darkened ridge-surfaces are disposed at an angular orientation away from said light source and with a reduced reflectance for reducing ambient reflections from said darkened ridge-surfaces.

3. The reflecting screen of claim 2 wherein:
said darkened-ridge surfaces further constituting a continuous concentric ridge surface having a reduced reflectance facing a direction away from said focal point of said Fresnel mirror.

4. The reflecting screen of claim 1 wherein:
said reflecting-ridge surfaces further constituting a continuous concentric ridge surface facing a direction toward said light source located at said focal point of said Fresnel mirror.

5. The reflecting screen of claim 1 wherein:
said reflecting-ridge surfaces further constituting a continuous concentric ridge surface facing a bottom direction toward said focal point of said Fresnel mirror for disposing a light source near a bottom location of said projecting screen.

6. The reflecting screen of claim 1 wherein:
said micro-ridges further constituting a continuous concentric ridge composed of a flexibly pressed material for forming as said substantially flat combined surface and supported on a substantially flat board.

7. The reflecting screen of claim 1 wherein:
said micro-ridges further constituting a continuous concentric ridge composed of an ultraviolet (UV) curable resin for forming as said substantially flat combined surface and supported on a substantially flat board.

8. The reflecting screen of claim 1 wherein:
said plurality of reflecting ridge-surfaces comprising a plurality of discrete curved reflecting surfaces and each of said discrete curved surface reflecting surfaces having substantially parabolic curvature and each having a different center of curvature for combining into said substantially flat combined surface.

9. The reflecting screen of claim 1 wherein:
said plurality of reflecting ridge-surfaces comprising a plurality of discrete curved reflecting surfaces and each of said discrete curved surface reflecting surfaces having substantially elliptic curvature and each having a different center of curvature for combining into said substantially flat combined surface.

10. The reflecting screen of claim 1 wherein:
said plurality of reflecting ridge-surfaces constituting a plurality of discrete reflecting surfaces each having said curved surface with a different center of curvature and combining into said Fresnel mirror for reflecting non-polarized light beams into parallel non-polarized reflecting beams.

11. The reflecting screen of claim 1 wherein:
said plurality of reflecting ridge-surfaces constituting a plurality of discrete reflecting surfaces each having said curved surface with a different center of curvature and combining into said Fresnel mirror for reflecting polarized light beams into parallel polarized reflecting beams.

12. An image display system comprising:
a reflecting screen having a reflecting surface comprising micro-ridges having a plurality of reflecting ridge-surfaces, each of said reflecting ridge-surfaces having a curved surface and each of said curved surfaces having a different center of curvature to form a substantially flat combined surface constituting a Fresnel mirror whereby said reflecting ridge-surfaces reflecting parallel reflecting light beams for all incident light beams projected from a light source located at a focal point of said Fresnel mirror.

13. The image display system of claim 12 wherein:
said micro-ridges further having a plurality of darkened ridge-surfaces between said reflecting-ridge surfaces wherein said darkened ridge-surfaces are disposed at an angular orientation away from said light source and with a reduced reflectance for reducing ambient reflections from said darkened ridge-surfaces.

14. The image display system of claim 12 wherein:
said reflecting-ridge surfaces further constituting a continuous concentric ridge surface facing a direction toward said light source located at said focal point of said Fresnel mirror.

15. The image display system of claim 12 wherein:
said reflecting-ridge surfaces further constituting a continuous concentric ridge surface facing a bottom direction toward said focal point of said Fresnel mirror for disposing a light source near a bottom location of said projecting screen.

16. The image display system of claim 12 wherein:
said darkened-ridge surfaces further constituting a continuous concentric ridge surface having a reduced reflectance facing a direction away from said focal point of said Fresnel mirror.

17. The image display system of claim 12 wherein:
said micro-ridges further constituting a continuous concentric ridge composed of a flexibly pressed material for forming as said substantially flat combined surface and supported on a substantially flat board.

18. The image display system of claim 12 wherein:
said micro-ridges further constituting a continuous concentric ridge composed of an ultraviolet (UV) curable resin for forming as said substantially flat combined surface and supported on a substantially flat board.

19. The image display system of claim 12 wherein:
said plurality of reflecting ridge-surfaces comprising a plurality of discrete curved reflecting surfaces and each of said discrete curved surface reflecting surfaces having substantially parabolic curvature and each having a different center of curvature for combining into said substantially flat combined surface.

20. The image display system of claim 12 wherein:
said plurality of reflecting ridge-surfaces comprising a plurality of discrete curved reflecting surfaces and each of said discrete curved surface reflecting surfaces having substantially elliptic curvature and each having a different center of curvature for combining into said substantially flat combined surface.

21. The image display system of claim 12 wherein:
said plurality of reflecting ridge-surfaces constituting a plurality of discrete reflecting surfaces each having said curved surface with a different center of curvature and combining into said Fresnel mirror for reflecting non-polarized light beams into parallel non-polarized reflecting beams.

22. The image display system of claim 12 wherein:
said plurality of reflecting ridge-surfaces constituting a plurality of discrete reflecting surfaces each having said curved surface with a different center of curvature and combining into said Fresnel mirror for reflecting polarized light beams into parallel polarized reflecting beams.

23. A method for projecting a light on to a reflecting screen to display an image thereon comprising:
forming a plurality of micro-ridges on said reflecting screen to provide a plurality of reflecting ridge-surfaces and forming each of said reflecting ridge-surfaces with a curved surface and each of said curved surfaces having a different center of curvature to form a substantially flat combined surface for constituting a Fresnel mirror.

24. The method of claim 23 further comprising:
projecting said light for displaying said image form a focal point of said Fresnel mirror for reflecting parallel reflecting light beams for all incident light beams projected to said reflecting ridge-surfaces each having said curved surface with different center of curvature.

25. The method of claim 23 further comprising a step of:
reducing ambient reflections from said micro-ridges by reducing a reflectance of a plurality of non-reflective ridge-surfaces opposite and between said reflecting ridge-surfaces.

26. The method of claim 23 further comprising a step of:
forming said micro-ridges as a continuous concentric ridge having said reflecting ridge-surfaces, formed as said curved surface each having different center of curvature, facing a direction toward a focal point of said Fresnel mirror.

27. The method of claim 23 further comprising a step of:
forming said micro-ridges further as a continuous concentric ridge having said reflecting ridge-surfaces, formed as said curved surface each having different center of curvature, facing a bottom direction toward a focal point of said Fresnel mirror for disposing a light source near a bottom location of said projecting screen.

28. The method of claim 23 further comprising a step of:
forming said micro-ridges further as a continuous concentric ridge having a reduced reflectance ridge-surfaces, opposite and between said reflecting ridge-surfaces, facing a direction away from a focal point of said Fresnel mirror.

29. The method of claim 23 further comprising a step of:
forming said micro-ridges as a continuous concentric ridge by employing a flexibly pressed material for forming as said substantially flat combined surface and supported on a substantially flat board.

30. The method of claim 23 further comprising a step of:
said micro-ridges further constituting a continuous concentric ridge composed of an ultraviolet (UV) curable resin for forming as said substantially flat combined surface and supported on a substantially flat board.

31. The method of claim 23 further comprising a step of:
forming said plurality of reflecting ridge-surfaces as a plurality of discrete reflecting curved surfaces and each of said discrete curved surface reflecting surfaces having substantially parabolic curvature and each having a different center of curvature for combining into said substantially flat combined surface.

32. The method of claim 23 further comprising a step of:
forming said plurality of reflecting ridge-surfaces as a plurality of discrete reflecting curved surfaces and each of said discrete curved surface reflecting surfaces having substantially elliptic curvature and each having a different center of curvature for combining into said substantially flat combined surface.

33. The method of claim 23 further comprising a step of:
forming said plurality of reflecting ridge-surfaces as a plurality of discrete reflecting surfaces each having said curved surface with a different center of curvature and combining into said Fresnel mirror for reflecting non-polarized light beams into parallel non-polarized.

34. The method of claim 23 further comprising a step of:
forming said plurality of reflecting ridge-surfaces as a plurality of discrete reflecting surfaces each having said curved surface with a different center of curvature and combining into said Fresnel mirror for reflecting polarized light beams into parallel polarized reflecting beams.

* * * * *